United States Patent
Du

(10) Patent No.: US 11,487,995 B2
(45) Date of Patent: Nov. 1, 2022

(54) METHOD AND APPARATUS FOR DETERMINING IMAGE QUALITY

(71) Applicant: Baidu Online Network Technology (Beijing) Co., Ltd., Beijing (CN)

(72) Inventor: Kang Du, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 1129 days.

(21) Appl. No.: 16/050,346

(22) Filed: Jul. 31, 2018

(65) Prior Publication Data
US 2019/0102603 A1 Apr. 4, 2019

(30) Foreign Application Priority Data

Sep. 29, 2017 (CN) .......................... 201710908705.7

(51) Int. Cl.
*G06N 3/04* (2006.01)
*G06N 7/00* (2006.01)
(Continued)

(52) U.S. Cl.
CPC .......... *G06N 3/0454* (2013.01); *G06N 3/084* (2013.01); *G06N 7/00* (2013.01); *G06N 20/00* (2019.01);
(Continued)

(58) Field of Classification Search
CPC ........ G06N 7/00; G06N 3/084; G06N 3/0454; G06N 3/0491; G06N 3/0481; G06N 20/00;
(Continued)

(56) References Cited

U.S. PATENT DOCUMENTS 9,928,410 B2 * 3/2018 Yoo .................. G06V 10/82
10,002,415 B2 * 6/2018 Shen ................ G06K 9/6256
(Continued)

OTHER PUBLICATIONS

Kim et al., "Fully Deep Blind Image Quality Predictor" Jan. 13, 2017, IEEE, pp. 206-220. (Year: 2017).*
(Continued)

*Primary Examiner* — Miranda M Huang
*Assistant Examiner* — Chase P. Hinckley
(74) *Attorney, Agent, or Firm* — Knobbe, Martens, Olson & Bear, LLP

(57) ABSTRACT

Embodiments of the present disclosure disclose a method and apparatus for determining image quality. The method comprises: acquiring a to-be-recognized image and facial region information used for indicating a facial region in the to-be-recognized image; extracting a face image from the to-be-recognized image on the basis of the facial region information; inputting the face image into a pre-trained convolutional neural network to obtain probabilities of each pixel comprised in the face image belonging to a category indicated by each category identifier in a preset category identifier set; inputting the face image into a pre-trained key face point positioning model to obtain coordinates of each key face point comprised in the face image; determining a probability of the face image being obscured on the basis of the probabilities and the coordinates; and determining whether the quality of the face image is up to standard on the basis of the probability.

16 Claims, 6 Drawing Sheets

(51) Int. Cl.
*G06N 3/08* (2006.01)
*G06N 20/00* (2019.01)
*G06V 40/16* (2022.01)
*G06V 10/25* (2022.01)
*G06K 9/62* (2022.01)
*G06V 10/98* (2022.01)
*G06V 10/764* (2022.01)
*G06T 7/00* (2017.01)
*G06V 10/82* (2022.01)

(52) U.S. Cl.
CPC ............ *G06V 10/25* (2022.01); *G06V 40/162* (2022.01); *G06V 40/168* (2022.01); *G06K 9/6256* (2013.01); *G06N 3/0481* (2013.01); *G06T 7/0002* (2013.01); *G06T 2207/20081* (2013.01); *G06T 2207/30168* (2013.01); *G06V 10/764* (2022.01); *G06V 10/82* (2022.01); *G06V 10/993* (2022.01); *G06V 40/161* (2022.01)

(58) Field of Classification Search
CPC .... G06K 9/6256; G06V 40/162; G06V 10/25; G06V 10/993; G06V 40/161; G06V 40/168; G06V 10/82
See application file for complete search history.

(56) References Cited

U.S. PATENT DOCUMENTS

| | | | | |
|---|---|---|---|---|
| 10,410,330 | B2* | 9/2019 | Liang | G06T 7/0002 |
| 2016/0358321 | A1* | 12/2016 | Xu | G06V 10/82 |
| 2017/0147905 | A1* | 5/2017 | Huang | G06K 9/6257 |
| 2017/0177979 | A1* | 6/2017 | Chokshi | G06V 10/82 |
| 2017/0243053 | A1* | 8/2017 | Li | G06T 7/143 |
| 2017/0262736 | A1* | 9/2017 | Yu | G06N 3/0445 |
| 2017/0308734 | A1* | 10/2017 | Chalom | G06V 40/171 |
| 2017/0351905 | A1* | 12/2017 | Wang | G06V 40/171 |
| 2018/0096457 | A1* | 4/2018 | Savvides | G06K 9/6256 |
| 2018/0129919 | A1* | 5/2018 | Tang | G06V 30/194 |
| 2018/0137388 | A1* | 5/2018 | Kim | G06V 30/194 |
| 2018/0286002 | A1* | 10/2018 | Bovik | G06T 7/0002 |
| 2018/0373924 | A1* | 12/2018 | Yoo | G06K 9/6262 |
| 2019/0080433 | A1* | 3/2019 | He | G06T 3/4007 |
| 2019/0080456 | A1* | 3/2019 | Song | G06T 7/11 |
| 2019/0122115 | A1* | 4/2019 | Wang | G06V 10/454 |
| 2020/0129263 | A1* | 4/2020 | Izadyyazdanabadi | G06N 3/0454 |
| 2020/0167930 | A1* | 5/2020 | Wang | G06T 7/0012 |
| 2021/0104043 | A1* | 4/2021 | Crawford | G06T 7/0014 |
| 2021/0133518 | A1* | 5/2021 | Yao | G06V 30/2504 |
| 2021/0165852 | A1* | 6/2021 | Granger | G05B 13/027 |

OTHER PUBLICATIONS

Zeng et al., "A Probabilistic Quality Representation Approach to Deep Blind Image Quality Prediction" Aug. 28, 2017, arXiv: 1708.08190v1, pp. 1-12. (Year: 2017).*

Liu, Ziewei, "Deep Learning Human-centric Representation in the Wild" Jul. 2017, Dissertation at Chinese University of Hong Kong, pp. i-159. (Year: 2017).*

Guan, Jingwei, "Image Quality Assessment and Multi-Focus Image Fusion" Aug. 2017, Dissertation at Chinese University of Hong Kong, pp. i-123. (Year: 2017).*

Dutta et al., "Predicting Face Recognition Performance using Image Quality" Oct. 24, 2015, arXiv: 1510.07119v1, pp. 1-14. (Year: 2015).*

Zhang et al., "Gradient Magnitude Similarity Deviation on Multiple Scales for Color Image Quality Assessment" Mar. 2017, pp. 1253-1257. (Year: 2017).*

Granger et al., "Computer Implemented Perceptual Apparatus" Jul. 26, 2017, U.S. Appl. No. 62/537,261, pp. 1-143. (Year: 2017).*

Liu et al., "RankIQA: Learning from Rankings for No-reference Image Quality Assessment" Jul. 26, 2017, arXiv: 1707.08347v1, pp. 1-10. (Year: 2017).*

Bosse et al., "Deep Neural Networks for No-Reference and Full-Reference Image Quality Assessment" Dec. 6, 2016, arXiv: 1612.01697v1, pp. 1-12. (Year: 2016).*

Zhang et al., "SOM: Semantic Obviousness Metric for Image Quality Assessment" 2015, pp. 2394-2402. (Year: 2015).*

Ma et al., "dipIQ: Blind Image Quality Assessment by Learning-to-Rank Discriminable Image Pairs" Jun. 13, 2017, pp. 3951-3964. (Year: 2017).*

Shao et al., "Learning Sparse Representation for No-Reference Quality Assessment of Multiply Distorted Stereoscopic Images" Jul. 15, 2017, pp. 1821-1836. (Year: 2017).*

Wu et al., "Q-DNN: A Quality Aware Deep Neural Network for Blind Assessment of Enhanced Images" Nov. 2016. (Year: 2016).*

Ye, Peng, "Feature Learning and Active Learning for Image Quality Assessment" 2014. (Year: 2014).*

Amara, Ibtihel, "Local Quality-Based Matching of Faces for Watchlist Screening Applications" Jan. 11, 2016, pp. i-180. (Year: 2016).*

Chen et al., "An Attention-Driven Approach of No-Reference Image Quality Assessment" May 29, 2017, arXiv: 1612.03530v3. (Year: 2017).*

Jia et al., "Contrast and visual saliency similarity-induced index for assessing image quality" Aug. 24, 2017, arXiv: 1708.06616v2, pp. 1-9. (Year: 2017).*

Liang et al., "Image Quality Assessment Using Similar Scene as a Reference" 2016, pp. 1-18. (Year: 2016).*

Wu et al., "A Perceptually Weighted Rank Correlation Indicator for Objective Image Quality Assessment" May 15, 2017, pp. 1-12. (Year: 2017).*

Guan et al., "Visual Importance and Distortion Guided Deep Image Quality Assessment Framework" 2017, pp. 2505-2520. (Year: 2017).*

Guan et al., "Quality Estimation Based Multi-Focus Image Fusion" 2017, pp. 1987-1991. (Year: 2017).*

* cited by examiner

METHOD AND APPARATUS FOR DETERMINING IMAGE QUALITY

CROSS-REFERENCE TO RELATED APPLICATIONS

This application is related to and claims priority from Chinese Application No. 201710908705.7, filed on Sep. 29, 2017 and entitled "Method and Apparatus for Determining Image Quality," the entire disclosure of which is hereby incorporated by reference.

TECHNICAL FIELD

The present disclosure relates to the field of computer technology, specifically relates to the field of Internet technology, and more specifically to a method and apparatus for determining image quality.

BACKGROUND

Facial recognition has been used in many application scenarios, such as face payment, face authentication and face beautification. If the quality of an image containing a face is not up to standard (for example, many parts of the face are obscured) in the process of facial recognition, a recognition error may occur, or abnormal situations such as system crash may happen. If the quality of the image containing face is checked before the facial recognition, the subsequent facial recognition on an image with quality not up to standard may be avoided, thereby improving the facial recognition efficiency. Therefore, it is significantly important to determine the quality of an image containing a face.

SUMMARY

An objective of some embodiments of the present disclosure is to propose a method and apparatus for determining image quality.

In a first aspect, some embodiments of the present disclosure provide a method for determining image quality, the method including: acquiring a to-be-recognized image and facial region information obtained by performing facial recognition on the to-be-recognized image in advance and used for indicating a facial region in the to-be-recognized image; extracting a face image from the to-be-recognized image on the basis of the facial region information; inputting the face image into a pre-trained convolutional neural network to obtain probabilities of each pixel included in the face image belonging to a category indicated by each category identifier in a preset category identifier set, the convolutional neural network being used to represent a corresponding relationship between an image containing a face and a probability of a pixel belonging to a category indicated by a category identifier in the category identifier set, and the category identifier set having a category identifier indicating a category representing a face part; inputting the face image into a pre-trained key face point positioning model to obtain coordinates of each key face point included in the face image, the key face point positioning model being used for representing a corresponding relationship between an image containing a face and coordinates of each key face point; determining a probability of the face image being obscured on the basis of the probabilities and the coordinates; and determining whether the quality of the face image is up to standard on the basis of the probability of the face image being obscured.

In some embodiments, the convolutional neural network is trained by: extracting a preset training sample including a sample image displaying a face and an annotation of the sample image, the annotation including a data flag for representing whether a pixel in the sample image belongs to a category indicated by a category identifier in the category identifier set; and training using a machine learning method on the basis of the sample image, the annotation, a preset classification loss function and a back propagation algorithm to obtain the convolutional neural network, the classification loss function being used for representing a degree of difference between a probability output by the convolutional neural network and the data flag included in the annotation.

In some embodiments, the convolutional neural network includes five convolutional layers and five deconvolutional layers, the convolutional layers being used for downsampling inputted information with a preset window sliding step, and the deconvolutional layers being used for upsampling the inputted information with a preset amplification factor.

In some embodiments, the window sliding step is 2, and the amplification factor is 2.

In some embodiments, the determining a probability of the face image being obscured on the basis of the probabilities and the coordinates includes: inputting the probabilities of the each pixel included in the face image belonging to the category indicated by the each category identifier in the category identifier set and the coordinates of the each key face point included in the face image into a preset probability calculation model to obtain the probability of the face image being obscured, wherein the probability calculation model is used to represent a corresponding relationship between inputted information and a probability of a face image being obscured, and the inputted information includes: probabilities of each pixel included in an image containing a face belonging to a category indicated by each category identifier in the category identifier set and coordinates of each key face point included in the image.

In some embodiments, the determining a probability of the face image being obscured on the basis of the probabilities and the coordinates further includes: determining a face part region set on the basis of the coordinates; determining, for each pixel included in the face image, a category indicated by a category identifier corresponding to a maximum probability corresponding to the pixel as a category the pixel attributed to; calculating, for each face part region, a probability of the face part region being obscured on the basis of a category to each pixel included in the face part region attributed to; and determining the probability of the face image being obscured on the basis of probabilities of each face part region in the face part region set being obscured.

In some embodiments, the calculating, for each face part region, a probability of the face part region being obscured on the basis of a category each pixel included in the face part region attributed to includes: determining, for the each face part region, a number of pixels in the face part region attributed to a category not matching a face part represented by the face part region, and determining a ratio of the number to a total number of pixels included in the face part region as the probability of the face part region being obscured.

In some embodiments, the calculating, for each face part region, a probability of the face part region being obscured on the basis of a category each pixel included in the face part region attributed to further includes: determining, for the each face part region, a target pixel group including a target pixel, in the face part region, attributed to a category not matching a face part represented by the face part region, summing probabilities of each target pixel in the determined target pixel group belonging to a category matching the face part to obtain a first value, summing probabilities of each pixel in the face part region belonging to a category matching the face part to obtain a second value, and determining a ratio of the first value to the second value as the probability of the facial region being obscured.

In some embodiments, the determining the probability of the face image being obscured on the basis of probabilities of each face part region in the face part region set being obscured includes: determining the probability of the face image being obscured on the basis of an average of the probabilities of the each face part region in the face part region set being obscured.

In some embodiments, the determining the probability of the face image being obscured on the basis of probabilities of each face part region in the face part region set being obscured further includes: acquiring a preset weight for representing an importance level of a face part; and weighting and summing the probabilities of the each face part region in the face part region set being obscured on the basis of the weight to obtain a numeric value, and defining the numeric value as the probability of the face image being obscured.

In some embodiments, the extracting a face image from the to-be-recognized image on the basis of the facial region information includes: enlarging a range of the facial region indicated by the facial region information to obtain a first facial region; and extracting the first facial region to obtain the face image.

In some embodiments, the facial region is a rectangular region; and the enlarging the range of the facial region indicated by the facial region information to obtain a first facial region includes: increasing a height and width of the facial region indicated by the facial region information by a preset multiplier factor, or increasing the height and width of the facial region by a preset numeric value.

In some embodiments, the determining whether the quality of the face image is up to standard on the basis of the probability of the face image being obscured includes: determining whether the probability of the face image being obscured is less than a probability threshold, and if the probability of the face image being obscured is less than the probability threshold, determining the quality of the face image being up to standard.

In a second aspect, some embodiments of the present disclosure provide an apparatus for determining image quality, the apparatus including: an acquisition unit, configured for acquiring a to-be-recognized image and facial region information obtained by performing facial recognition on the to-be-recognized image in advance and used for indicating a facial region in the to-be-recognized image; an extraction unit, configured for extracting a face image from the to-be-recognized image on the basis of the facial region information; a first input unit, configured for inputting the face image into a pre-trained convolutional neural network to obtain probabilities of each pixel included in the face image belonging to a category indicated by each category identifier in a preset category identifier set, the convolutional neural network being used to represent a corresponding relationship between an image containing a face and a probability of a pixel belonging to a category indicated by a category identifier in the category identifier set, and the category identifier set having a category identifier indicating a category representing a face part; a second input unit, configured for inputting the face image into a pre-trained key face point positioning model to obtain coordinates of each key face point included in the face image, the key face point positioning model being used for representing a corresponding relationship between an image containing a face and coordinates of each key face point; a first determination unit, configured for determining a probability of the face image being obscured on the basis of the probabilities and the coordinates; and a second determination unit, configured for determining whether the quality of the face image is up to standard on the basis of the probability of the face image being obscured.

In some embodiments, the convolutional neural network is trained by: extracting a preset training sample including a sample image displaying a face and an annotation of the sample image, the annotation including a data flag for representing whether a pixel in the sample image belongs to a category indicated by a category identifier in the category identifier set; and training using a machine learning method on the basis of the sample image, the annotation, a preset classification loss function and a back propagation algorithm to obtain the convolutional neural network, the classification loss function being used for representing a degree of difference between a probability output by the convolutional neural network and the data flag included in the annotation.

In some embodiments, the first determination unit includes: a first determination subunit, configured for determining a face part region set on the basis of the coordinates; a second determination unit, configured for determining, for each pixel included in the face image, a category indicated by a category identifier corresponding to a maximum probability corresponding to the pixel as a category the pixel attributed to; a calculation subunit, configured for calculating, for each face part region, a probability of the face part region being obscured on the basis of a category each pixel included in the face part region attributed to; and a third determination subunit, configured for determining the probability of the face image being obscured on the basis of probabilities of each face part region in the face part region set being obscured.

In some embodiments, the convolutional neural network includes five convolutional layers and five deconvolutional layers, the convolutional layers being used for downsampling inputted information with a preset window sliding step, and the deconvolutional layers being used for upsampling the inputted information with a preset amplification factor.

In some embodiments, the window sliding step is 2, and the amplification factor is 2.

In some embodiments, the first determination unit further includes: an input subunit, configured for inputting the probabilities of the each pixel included in the face image belonging to the category indicated by the each category identifier in the category identifier set and the coordinates of the each key face point included in the face image into a preset probability calculation model to obtain the probability of the face image being obscured, wherein the probability calculation model is used to represent a corresponding relationship between inputted information and a probability of a face image being obscured, and the inputted information includes: probabilities of each pixel included in an image containing a face belonging to a category indicated by each category identifier in the category identifier set and coordinates of each key face point included in the image.

In some embodiments, the calculation subunit is further configured for: determining, for each face part region, a number of pixels in the face part region attributed to a category not matching a face part represented by the face part region, and determining a ratio of the number to a total number of pixels included in the face part region as the probability of the face part region being obscured.

In some embodiments, the calculation subunit is also further configured for: determining, for each face part region, a target pixel group including a target pixel, in the face part region, attributed to a category not matching a face part represented by the face part region, summing probabilities of each target pixel in the determined target pixel group belonging to a category matching the face part to obtain a first value, summing probabilities of each pixel in the face part region belonging to a category matching the face part to obtain a second value, and determining a ratio of the first value to the second value as the probability of the facial region being obscured.

In some embodiments, the third determination subunit is further configured for: determining the probability of the face image being obscured on the basis of an average of the probabilities of the each face part region in the face part region set being obscured.

In some embodiments, the third determination subunit is also further configured for: acquiring a preset weight for representing an importance level of a face part; and weighting and summing the probabilities of the each face part region in the face part region set being obscured on the basis of the weight to obtain a numeric value, and defining the numeric value as the probability of the face image being obscured.

In some embodiments, the extraction unit includes: an enlarging subunit, configured for enlarging a range of the facial region indicated by the facial region information to obtain a first facial region; and an extracting subunit, configured for extracting the first facial region to obtain the face image.

In some embodiments, the facial region is a rectangular region; the enlarging subunit is further configured for: increasing a height and width of the facial region indicated by the facial region information by a preset multiplier factor, or increasing the height and width of the facial region by a preset numeric value.

In some embodiments, the second determination unit is further configured for: determining whether the probability of the face image being obscured is less than a probability threshold, and if the probability of the face image being obscured is less than the probability threshold, determining the quality of the face image being up to standard.

In a third aspect, some embodiments of the present disclosure provide an electronic device, the electronic device including: one or more processors; and a storage, for storing one or more programs, the one or more programs, when executed by the one or more processors, causing the one or more processors to implement the method according to any implementation in the first aspect.

In a forth aspect, some embodiments of the present disclosure provide a computer readable storage medium storing a computer program, the program, when executed by a processor, implementing the method according to any implementation in the first aspect.

The method and apparatus for determining image quality as provided in some embodiments of the present disclosure make full use of the extraction for face images, shorten the determination range and improve the image quality determination efficiency by: acquiring a to-be-recognized image and facial region information obtained by performing facial recognition on the to-be-recognized image in advance and used for indicating a facial region in the to-be-recognized image to extract a face image from the to-be-recognized image on the basis of the facial region information; and then inputting the face image into a pre-trained convolutional neural network to obtain probabilities of each pixel included in the face image belonging to a category indicated by each category identifier in a preset category identifier set; inputting the face image into a pre-trained key face point positioning model to obtain coordinates of each key face point included in the face image; and finally, determining a probability of the face image being obscured on the basis of the probabilities and the coordinates so as to determine whether the quality of the face image is up to standard on the basis of the probability of the face image being obscured.

Moreover, probabilities of each pixel included in the face image belonging to a category indicated by each category identifier in a preset category identifier set is determined and coordinates of each key face point included in the face image are determined, so that a probability of the face image being obscured may be determined on the basis of the probabilities and the coordinates, thereby improving the accuracy of the probability of the face image being obscured so as to improve the accuracy of the image quality determination result.

BRIEF DESCRIPTION OF THE DRAWINGS

Other features, objects, and advantages of the present disclosure will become more apparent by reading the detailed description about the non-limiting embodiments with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
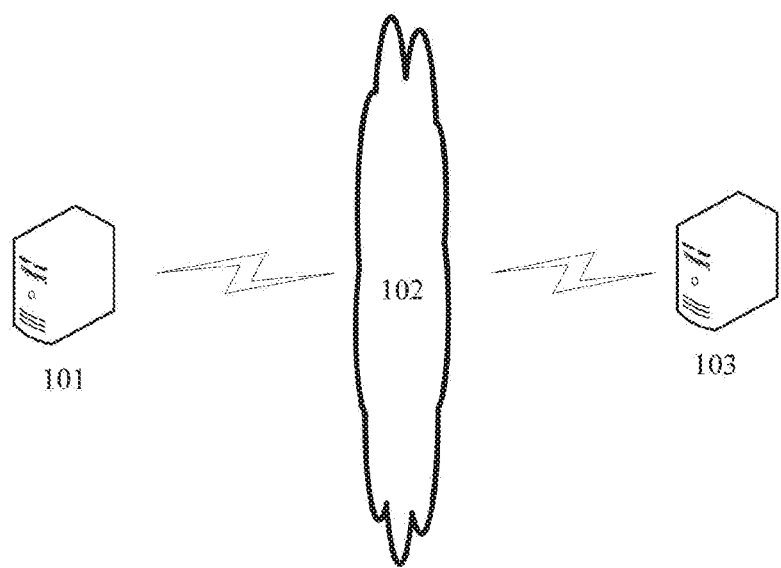
FIG. 1 is an architectural diagram of a system in which some embodiments of the present disclosure may be implemented.

FIG. 1 shows a system architecture 100 which may be used by a method for determining image quality or an apparatus for determining image quality according to some embodiments of the present disclosure.

As shown in FIG. 1, the system architecture 100 may include a data storage server 101, a network 102 and an image processing server 103. The network 102 serves as a medium providing a communication link between the data storage server 101 and the image processing server 103. The network 102 may include various types of connections, such as wired or wireless transmission links, or optical fibers.

The data storage server 101 may be a server providing various services, for example, a server for storing an image containing a face and facial region information for indicating a facial region in the image. Optionally, the data storage server 101 may further have the function of facial recognition, and the facial region information may be generated after the data storage server 101 performs facial recognition on the image.

The image processing server 103 may be a server providing various services, for example, acquiring a to-be-recognized image and facial region information for indicating a facial region in the to-be-recognized image from the data storage server 101, and performing determination based on the to-be-recognized image and the facial region information to obtain a determination result.

It should be noted that the method for determining image quality according to some embodiments of the present disclosure is generally executed by the image processing server 103. Accordingly, an apparatus for determining image quality is generally installed on the image processing server 103.

It should be noted that, if the to-be-recognized image and the facial region information for indicating a facial region in the to-be-recognized image to be acquired by the image processing server 103 are prestored locally in the image processing server 103, then the system architecture 100 may not include the data storage server 101.

It should be understood that the numbers of the data storage servers, the networks and the image processing servers in FIG. 1 are merely illustrative. Any number of data storage servers, networks and image processing servers may be provided based on the actual requirements.

Figure 2:
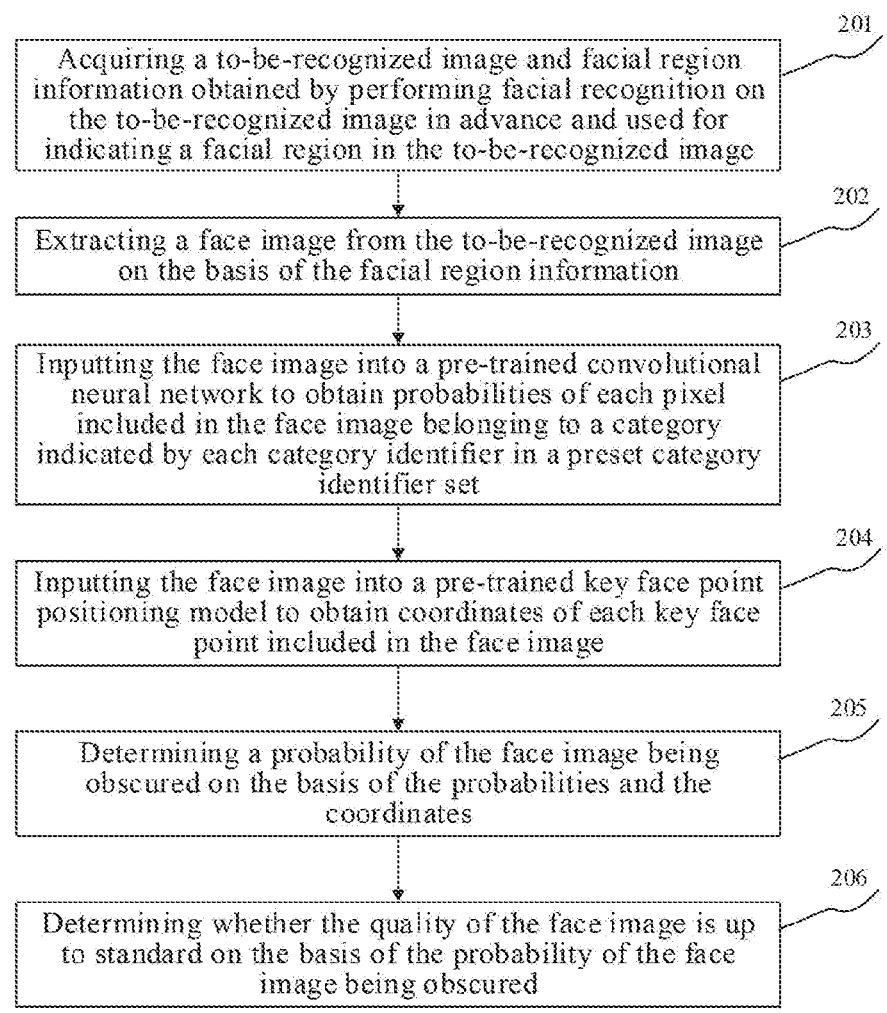
FIG. 2 is a flowchart of an embodiment of a method for determining image quality according to the present disclosure.

Further referring to FIG. 2, FIG. 2 shows a flow 200 of an embodiment of a method for determining image quality according to the present disclosure. The flow 200 of the method for determining image quality includes the following steps.

Step 201, acquiring a to-be-recognized image and facial region information obtained by performing facial recognition on the to-be-recognized image in advance and used for indicating a facial region in the to-be-recognized image.

In some embodiments, an electronic device (the image processing server 103 shown in FIG. 1, for example) on which the method for determining image quality is performed may acquire a to-be-recognized image and facial region information obtained by performing facial recognition on the to-be-recognized image in advance and used for indicating a facial region in the to-be-recognized image from a data storage server (the data storage server 101 shown in FIG. 1, for example) connected thereto by means of a wired connection or a wireless connection. Of course, if the to-be-recognized image and the facial region information are stored locally in the electronic device in advance, the electronic device may acquire the to-be-recognized image and the facial region information locally.

It should be noted that the facial region may be a facial region in any shape (for example, a circular region, a rectangular region). When the facial region in the to-be-recognized image is a circular region here, the facial region information may include, for example, coordinates of a center point of the facial region and a radius of the facial region. When the facial region in the to-be-recognized image is a rectangular region, the facial region information may include, for example, coordinates, height and width of at least one vertex of the facial region.

It should be noted that the to-be-recognized image and the facial region information may be acquired by the electronic device actively or by the electronic device passively (for example, the to-be-recognized image and the facial region information are sent to the electronic device by the data storage server), which is not limited by the present embodiment.

In some alternative implementations, the electronic device may also acquire the to-be-recognized image and the facial region information from a terminal device connected thereto. It should be noted that the present embodiment does not limit the source of the to-be-recognized image and the facial region information.

Step 202, extracting a face image from the to-be-recognized image on the basis of the facial region information.

In some embodiments, the electronic device, after acquiring the to-be-recognized image and the facial region information, may extract a face image from the to-be-recognized image on the basis of the facial region information. As an example, the electronic device may extract a facial region indicated by the facial region information in the to-be-recognized image to obtain a face image.

Step 203, inputting the face image into a pre-trained convolutional neural network to obtain probabilities of each pixel included in the face image belonging to a category indicated by each category identifier in a preset category identifier set.

In some embodiments, the electronic device, after obtaining the face image, may input the face image into a pre-trained convolutional neural network to obtain probabilities of each pixel included in the face image belonging to a category indicated by each category identifier in a preset category identifier set. The convolutional neural network may be used to represent a corresponding relationship between an image containing a face and a probability of a pixel belonging to a category indicated by a category identifier in the category identifier set. The category identifier set may include a category identifier indicating a category representing a face part (for example, eye, eyebrow, forehead, chin, nose, or gill). Furthermore, the category identifier set may include a category identifier indicating a category representing hair or background. In addition, a probability output by the convolutional neural network may be a numeric value within the interval of [0, 1].

In practice, the convolutional neural network (CNN) is a feedforward neural network, and the artificial neurons thereof may respond to a part of the surrounding cells within the coverage area and have excellent performance in image processing. Therefore, the convolutional neural network may be used to determine a probability of a pixel belonging to a category indicated by a category identifier in the preset category identifier set.

It should be noted that the convolutional neural network may be obtained by supervising and training the existing deep convolutional neural network (for example, DenseBox, VGGNet, ResNet, SegNet) using a machine learning method. It should be noted that the convolutional neural network may include at least one convolutional layer and at least one deconvolutional layer. The convolutional layer may, for example, downsample inputted information. The deconvolutional layer may, for example, upsample the inputted information. Furthermore, the convolutional neural network may also use various nonlinear activation functions (for example, ReLU (rectified linear units) function, or sigmoid function) to perform nonlinear calculation on the information.

Step 204, inputting the face image into a pre-trained key face point positioning model to obtain coordinates of each key face point included in the face image.

In some embodiments, the electronic device may also input the extracted face image into a pre-trained key face point positioning model to obtain coordinates of each key face point included in the face image. The key face point positioning model may be used for representing a corresponding relationship between an image containing a face and coordinates of each key face point. It should be noted that the key face point may be a pre-designated point with strong semantic information (for example, a corner of the eye, a corner of the mouth, a wing of the nose, a point in the contour) in a face. In practice, the number of key face points may be 72 or other preset value, which is not limited by the present embodiment.

The key face point positioning model here may be a corresponding relationship table pre-established by a technician on the basis of a large number of statistics and used to represent a corresponding relationship between an image containing a face and coordinates of a key face point. The key face point positioning model may also be obtained by training using various existing logistic regression models (LR).

It should be noted that steps 203 and 204 may be executed in parallel or in series. When the steps 203 and 204 are executed in series, the execution order of the steps 203 and 204 is not limited by the present embodiment.

In some alternative implementations of the present embodiment, the key face point positioning model may be obtained by supervising and training the existing deep convolutional neural network using a machine learning method. It should be noted that the key face point positioning model may include, for example, at least one convolutional layer, at least one pooling layer, and at least one fully connected layer (FC). The convolutional layer may be used to extract image features (the image features may be various basic elements of an image, such as color, line or texture); the pooling layer may be used to downsample inputted information; and the at least one fully connected layer may include a fully connected layer for outputting coordinates of each key face point. Furthermore, the key face point positioning model may also use various nonlinear activation functions (for example, ReLU (rectified linear units) function and sigmoid function) to perform nonlinear calculation on the information.

Step 205, determining a probability of the face image being obscured on the basis of the probabilities and the coordinates.

In some embodiments, the electronic device, after executing the step 203 and the step 204, may determine a probability of the face image being obscured on the basis of the probabilities as obtained in the step 203 and the coordinates as obtained in the step 204.

As an example, the electronic device may first obtain semantic information of each key face point included in the face image on the basis of the position of the each key face point in the face image. The electronic device may then query a probability of a key face point belonging to a category indicated by a category identifier in the category identifier set on the basis of the probabilities obtained in step 203 (the probability of the key face point may be a probability determined in step 203 and corresponding to a pixel at the same position as the key face point), and a category identifier corresponding to a maximum probability may be used as a category identifier corresponding to the key face point. Then, the electronic device may find a key face point having semantic information not matching the category indicated by the corresponding category identifier from the key face points included in the face image (for example, the semantic information indicates canthus, and the category indicated by the corresponding category identifier indicates gill, so the semantic information does not match the category since the canthus does not belong to gills), and classify the key face point into a key face point group. Finally, the electronic device may determine the ratio of the total number of key face points included in the key face point group to the total number of key face points included in the face image as the probability of the face image being obscured.

In some alternative implementations of the present embodiment, the electronic device may input the probabilities of the each pixel included in the face image belonging to the category indicated by the each category identifier in the category identifier set and the coordinates of the each key face point included in the face image into a preset probability calculation model to obtain the probability of the face image being obscured. The probability calculation model may be used to represent a corresponding relationship between inputted information and a probability of a face image being obscured. The inputted information may include: probabilities of each pixel included in an image containing a face belonging to a category indicated by each category identifier in the category identifier set and the coordinates of each key face point included in the image.

It should be noted that the probability calculation model may be a corresponding relationship table pre-established by a technician on the basis of a large number of statistics and used to represent a corresponding relationship between inputted information and the probability of the face image being obscured. The probability calculation model may also be a calculation formula pre-established by a technician on the basis of a large number of statistics and used to calculate a probability of an image containing a face being obscured on the basis of the probabilities of each pixel included in the image containing the face belonging to a category indicated by each category identifier in the category identifier set and the coordinates of each key face point included in the image.

Step 206, determining whether the quality of the face image is up to standard on the basis of the probability of the face image being obscured.

In some embodiments, the electronic device, after determining the probability of the face image being obscured, may determine whether the quality of the face image is up to standard on the basis of the probability of the face image being obscured. As an example, the electronic device may compare the probability of the face image being obscured with a preset probability threshold, and if the probability of the face image being obscured is not less than the probability threshold, the electronic device may determine that the quality of the face image is not up to standard. It should be noted that the probability threshold may be, for example, a numeric value of 0.5 or the like, and the probability threshold may be modified according to actual needs, which is not limited in the embodiment.

Optionally, if the probability of the face image being obscured is less than the probability threshold, the electronic device may determine that the quality of the face image is up to standard.

In some alternative implementations of the present embodiment, if the electronic device determines that the quality of the face image is up to standard, the electronic device may also output the to-be-recognized image. For example, the to-be-recognized image is output to a system for facial recognition on the to-be-recognized image.

In some alternative implementations of the present embodiment, the electronic device may also generate a determination result. The determination result may include, for example, an identifier for indicating whether the quality of the face image is up to standard. In addition, the to-be-recognized image may have an image identifier, and the determination result may also include at least one of: the image identifier, the position of the face image in the to-be-recognized image, or the probability of the face image being obscured.

Figure 3:
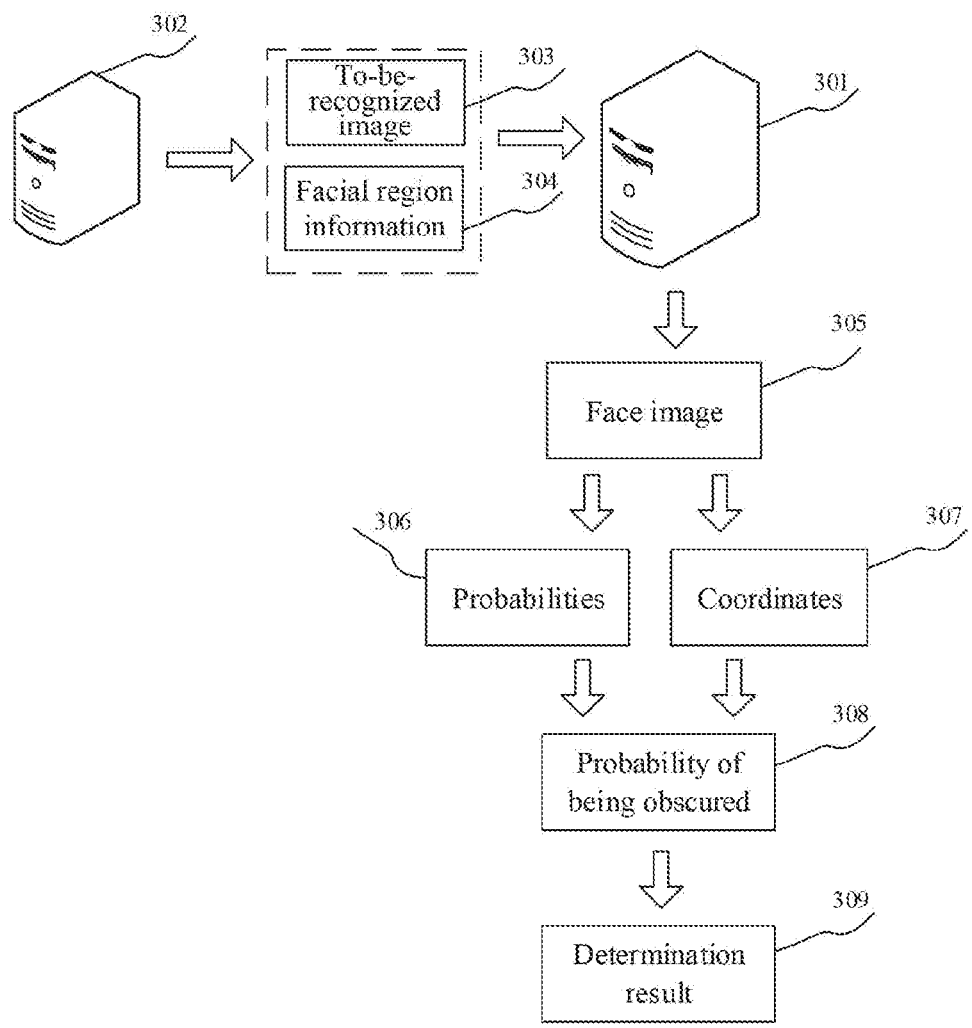
FIG. 3 is a schematic diagram of an application scenario of a method for determining image quality according to some embodiments of the present disclosure.

Further referring to FIG. 3, FIG. 3 shows a schematic diagram of an application scenario of a method for determining image quality according to some embodiments. In the application scenario in FIG. 3, an image processing server 301 may acquire a to-be-recognized image 303 and facial region information 304 obtained by performing facial recognition on the to-be-recognized image 303 in advance and used for indicating a facial region in the to-be-recognized image 303 from a data storage server 302 connected thereto. The image processing server 301 may then extract a facial region indicated by the facial region information 304 in the to-be-recognized image 303 to obtain a face image 305. The image processing server 301 may then input the face image 305 into a pre-trained convolutional neural network and a key face point positioning model simultaneously to obtain probabilities 306, output by the convolutional neural network, of each pixel included in the face image 305 belonging to a category indicated by each category identifier in a preset category identifier set and obtain coordinates 307, output by the key face point positioning model, of each key face point. The image processing server 301 may then determine a probability 308 of the face image 305 being obscured on the basis of the probabilities 306 and the coordinates 307. Finally, the image processing server 301 may compare the probability 308 of the image being obscured with a probability threshold to obtain a determination result 309 as to whether the quality of the face image 305 is up to standard.

The method provided by some embodiments of the present disclosure makes full use of the extraction for face images, shortens the determination range and improves the image quality determination efficiency.

Moreover, probabilities each pixel included in the face image belonging to a category indicated by each category identifier in a preset category identifier set are determined and coordinates of each key face point included in the face image are determined, so that a probability of the face image being obscured may be determined on the basis of the probabilities and the coordinates, thereby improving the accuracy of the probability of the face image being obscured so as to improve the accuracy of the image quality determination result.

Figure 4:
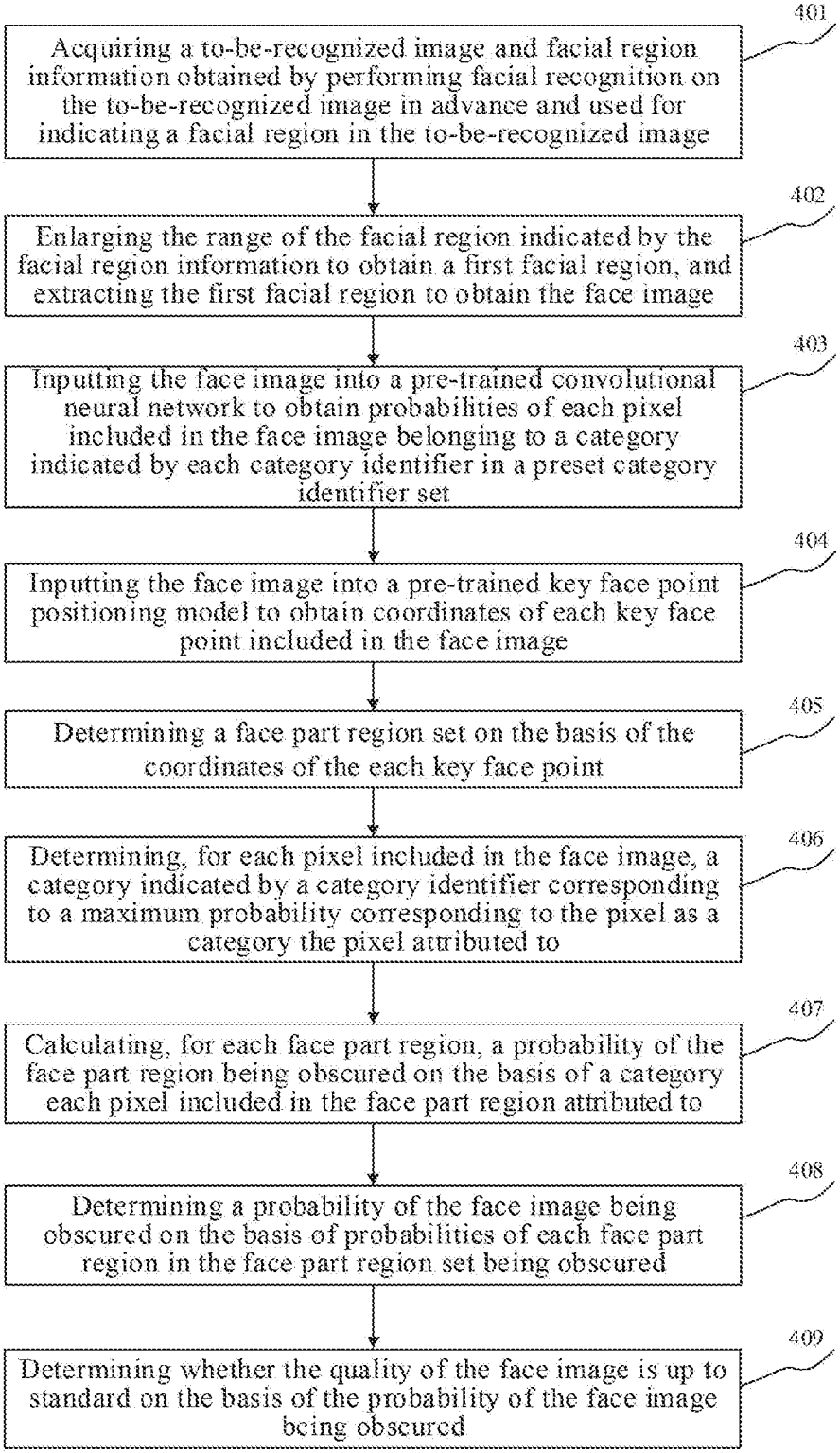
FIG. 4 is a flowchart of another embodiment of a method for determining image quality according to the present disclosure.

Further referring to FIG. 4, FIG. 4 shows a flow 400 of another embodiment of a method for determining image quality. The flow 400 of the method for determining image quality includes the following steps.

Step 401, acquiring a to-be-recognized image and facial region information obtained by performing facial recognition on the to-be-recognized image in advance and used for indicating a facial region in the to-be-recognized image.

In some embodiments, an electronic device (the image processing server 103 shown in FIG. 1, for example) on which the method for determining image quality is performed may acquire a to-be-recognized image and facial region information obtained by performing facial recognition on the to-be-recognized image in advance and used for indicating a facial region in the to-be-recognized image from a data storage server (the data storage server 101 shown in FIG. 1, for example) connected thereto by means of a wired connection or a wireless connection. Of course, if the to-be-recognized image and the facial region information are stored locally in the electronic device in advance, the electronic device may acquire the to-be-recognized image and the facial region information locally. It should be noted that the facial region may be a rectangular region.

Step 402, enlarging the range of the facial region indicated by the facial region information to obtain a first facial region, and extracting the first facial region to obtain the face image.

In some embodiments, the electronic device, after obtaining the to-be-recognized image and the facial region information, may enlarge the range of the facial region indicated by the facial region information to obtain a first facial region. The electronic device may extract the first facial region to obtain the face image.

In some embodiments, the electronic device may increase the height and width of the facial region indicated by the facial region information by a preset multiplier factor or increase the height and width of the facial region by a preset numeric value, and take the enlarged facial region as a first facial region. The preset multiplier factor here may be, for example, a numeric value such as 1. Moreover, the height and the width may correspond to the same preset numeric value or different preset numeric values. For example, a preset numeric value corresponding to the height is the same numeric value as the height, and a preset numeric value corresponding to the width is the same numeric value as the height. The preset multiplier factor and the preset numeric value may be modified according to the actual needs, which is not limited by the present embodiment.

Step 403, inputting the face image into a pre-trained convolutional neural network to obtain probabilities of each pixel included in the face image belonging to a category indicated by each category identifier in a preset category identifier set.

In some embodiments, the electronic device, after obtaining the face image, may input the face image into a pre-trained convolutional neural network to obtain probabilities of each pixel included in the face image belonging to a category indicated by each category identifier in a preset category identifier set. The convolutional neural network may be used to represent a corresponding relationship between an image including a face and a probability of a pixel belonging to a category indicated by a category identifier in the category identifier set. The category identifier set may include a category identifier indicating a category representing a face part (for example, eye, eyebrow, forehead, chin, nose, or gill). Furthermore, the category identifier set may include a category identifier indicating a category representing hair or background.

The convolutional neural network here may include, for example, five convolutional layers and five deconvolutional layers. The convolutional layer may be used for downsampling inputted information with a preset window sliding step. The deconvolutional layer may be used for upsampling the inputted information with a preset amplification factor. The window sliding step may be 2, and the amplification factor may be 2.

It should be noted that the convolutional neural network may be obtained by training through the following training steps.

First, the electronic device may extract a preset training sample including a sample image displaying a face and an annotation of the sample image. The annotation may include a data flag for representing whether a pixel in the sample image belongs to the category indicated by each category identifier in the category identifier set. The number of data flags corresponding to each pixel here is the same as the number of category identifiers in the category identifier set. It should be noted that the data flags may include 0 and 1. 0 may represent "not belonging to", and 1 may represent "belonging to". As an example, if a data flag associated with a pixel and a category identifier is 0, it may be represented that the pixel does not belong to a category indicated by the category identifier. It should be noted that the annotation may be expressed with a matrix.

Then, the electronic device may train using a machine learning method on the basis of the sample image, the annotation, a preset classification loss function and a back propagation algorithm to obtain a convolutional neural network. The classification loss function may be used for representing the degree of difference between a probability output by the convolutional neural network and the data flag included in the annotation. The classification loss function may be various loss functions for classification (for example, a hinge loss function or a softmax loss function). In the training process, the classification loss function may constrain the way and direction a convolutional kernel is modified. The goal of the training is to minimize the value of the classification loss function. Therefore, the parameters of the convolutional neural network obtained by training are the corresponding parameters when the value of the classification loss function is the minimum.

It should be noted that the back propagation algorithm (BP algorithm) may also be called error back propagation (BP) algorithm. The BP algorithm consists of two learning processes: the forward propagation of a signal and the backward propagation of an error. In a feedforward network, an input signal is inputted through an input layer, and is outputted through an output layer upon hidden layer calculation. An output value is compared with a mark value. If there is an error, the error 25 is propagated from the output layer to the input layer in the reverse direction, in this process, a gradient descent algorithm (for example, a random gradient descent algorithm) may be used to adjust a neuron weight (for example, parameters of a convolutional kernel in a convolutional layer). The classification loss function here may be used to represent the error between the output value and the mark value.

Step 404, inputting the face image into a pre-trained key face point positioning model to obtain coordinates of each key face point included in the face image.

In some embodiments, the electronic device may also input the obtained face image into a pre-trained key face point positioning model to obtain coordinates of each key face point included in the face image. The key face point positioning model may be used to represent a corresponding relationship between an image containing a face and the coordinates of each key face point.

The key face point positioning model here may be a corresponding relationship table pre-established by a technician on the basis of a large number of statistics and used to represent a corresponding relationship between an image containing a face and coordinates of a key face point. The key face point positioning model may also be obtained by training using various existing logistic regression models (LR), or obtained by supervising and training the existing deep convolutional neural network using a machine learning method and a training sample.

It should be noted that steps 403 and 404 may be executed in parallel or in series. When the steps 403 and 404 are executed in series, the execution order of the steps 403 and 404 is not limited by the present embodiment.

Step 405, determining a face part region set on the basis of the coordinates of the each key face point.

In some embodiments, the electronic device, after obtaining the coordinates of each key face point included in the face image, may determine a face part region set on the basis of the coordinates. Different face part regions may include different parts of the face, such as eyes, mouth, nose, forehead and chin. The eyes may also be divided into the left eye and the right eye. The electronic device here may determine semantic information of each key face point on the basis of the position of each key face point in the face image, such as semantic information representing canthus, corners of the mouth and nose wings. The electronic device may determine at least one closed region for representing a part of a face on the basis of the semantic information, and determine a face part region set based on each determined closed region.

Taking the left eye as an example, the electronic device may find each key face point with a position on the left side of the face and having semantic information related to the eyes (for example, the semantic information indicates canthus, upper eye edge and lower eye edge). The electronic device may use the biggest closed region formed by the each key face point as a face part region for representing the left eye.

Step 406, determining, for each pixel included in the face image, a category indicated by a category identifier corresponding to a maximum probability corresponding to the pixel as a category the pixel attributed to.

In some embodiments, the electronic device may determine, for each pixel included in the face image, a category indicated by a category identifier corresponding to a maximum probability determined in step 403 and corresponding to the pixel as a category the pixel attributed to. As an example, for a pixel P, suppose a category identifier set includes category identifiers A, B and C, the probability of the pixel P belonging to a category indicated by the category identifier A is 0.6, the probability of the pixel P belonging to a category indicated by the category identifier B is 0.7, and the probability of the pixel P belonging to a category indicated by the category identifier C is 0.8, then the maximum probability corresponding to the pixel P is 0.8. Therefore, the electronic device may determine the category indicated by category identifier C as the category the pixel P attributed to.

Step 407, calculating, for each face part region, a probability of the face part region being obscured on the basis of a category each pixel included in the face part region attributed to.

In some embodiments, after determining the face part region set, the electronic device may calculate, for each face part region in the face part region set, a probability of the face part region being obscured on the basis of a category each pixel included in the face part region attributed to. As an example, the electronic device may determine a number of pixels in the face part region attributed to a category which does not match a face part represented by the face part region, and determine the ratio of the number to a total number of pixels included in the face part region as the probability of the face part region being obscured.

It should be noted that a category indicated by each category identifier in the category identifier set may have a category name. The electronic device may establish a corresponding relationship between the category name and a part name in advance. Furthermore, the electronic device may assign a corresponding part name to each of the determined face part regions. The electronic device may determine whether the category a pixel attributed to matches a face part represented by the face part region through the corresponding relationship.

In some alternative implementations of the present embodiment, the electronic device may also determine the probability of the face part region in the face part region set being obscured by: determining, for each face part region, a target pixel group including a target pixel, in the face part region, attributed to a category which does not match a face part represented by the face part region, summing the probabilities of target pixels in the target pixel group belonging to categories that match the face part to obtain a first value, summing the probabilities of pixels in the face part region belonging to categories that match the face part to obtain a second value, and determining the ratio of the first value to the second value as the probability of the facial region being obscured.

Step 408, determining a probability of the face image being obscured on the basis of probabilities of each face part region in the face part region set being obscured.

In some embodiments, after determining probabilities of each face part region in the face part region set being obscured, the electronic device may determine the probability of the face image being obscured on the basis of the probabilities. As an example, the electronic device may determine a probability of the face image being obscured on the basis of the average of probabilities of face part regions in the face part region set being obscured.

In some alternative implementations of the present embodiment, the electronic device may also acquire a preset weight for representing an importance level of a face part. The electronic device may weight and sum the probabilities of the face part regions in the face part region set being obscured on the basis of the weight to obtain a numeric value, and define the numeric value as the probability of the face image being obscured.

As an example, suppose the face part region set includes face part regions A, B, and C that represent the following face parts in sequence: left eye, right eye and mouth. The probabilities of the face part regions A, B, and C being obscured are 0.3, 0.3, and 0.6 respectively. The weight corresponding to the left eye is 0.4, the weight corresponding to the right eye is 0.4, and the weight corresponding to the mouth is 0.2. The electronic device may multiply the probability 0.3 of the face part region A being obscured by the weight 0.4 to obtain a product of 0.12, multiply the probability 0.3 of the face part region B being obscured by the weight 0.4 to obtain a product of 0.12, and multiply the probability 0.6 of the face part region C being obscured by the weight 0.2 to obtain a product of 0.12. The electronic device may then sum the three obtained products to obtain 0.36 and define 0.36 as the probability of the face image being obscured.

It should be noted that the sum of the weights obtained by the electronic device may be 1.

Step 409, determining whether the quality of the face image is up to standard on the basis of the probability of the face image being obscured.

In some embodiments, after determining the probability of the face image being obscured, the electronic device may determine whether the quality of the face image is up to standard on the basis of the probability of the face image being obscured. As an example, the electronic device may compare the probability of the face image being obscured with a preset probability threshold, and if the probability of the face image being obscured is not less than the probability threshold, the electronic device may determine that the quality of the face image is not up to standard. Otherwise, the electronic device may determine that the quality of the face image is up to standard. It should be noted that the probability threshold may be, for example, a numeric value of 0.5 or the like, and the probability threshold may be modified according to the actual needs, which is not limited by the present embodiment.

As may be seen from FIG. 4, compared with the embodiment corresponding to FIG. 2, the flow 400 of the method for determining image quality in some embodiments highlights the step (that is, step 402) of enlarging the range of a facial region in a to-be-recognized image and the steps (that is, steps 405 to 408) of determining the probability of the face image being obscured. As a result, the solution described in some embodiments may enlarge the coverage area of a face image by enlarge the range thereof, so that the face image includes as many key face points as possible. Determining the probability of the face image being obscured by means of the steps 405 to 408 may improve the accuracy of the probability.

Figure 5:
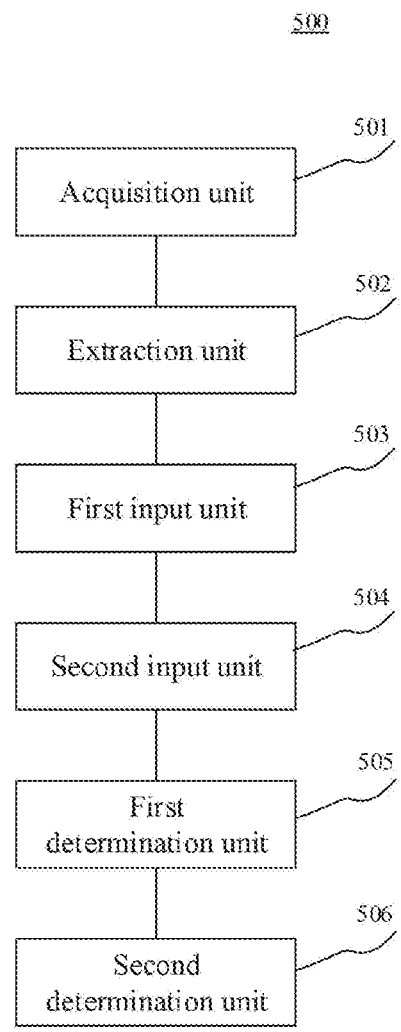
FIG. 5 is a structural schematic diagram of an embodiment of an apparatus for determining image quality according to the present disclosure.

Referring further to FIG. 5, the present disclosure, as an implementation of the method shown in the figures above, provides an embodiment of an apparatus for determining image quality. The apparatus embodiment corresponds to the method embodiment as shown in FIG. 2, and the apparatus may be specifically applied to various electronic devices.

As shown in FIG. 5, an apparatus 500 for determining image quality as shown in some embodiments includes: an acquisition unit 501, an extraction unit 502, a first input unit 503, a second input unit 504, a first determination unit 505 and a second determination unit 506. The acquisition unit 501 is configured for acquiring a to-be-recognized image and facial region information obtained by performing facial recognition on the to-be-recognized image in advance and used for indicating a facial region in the to-be-recognized image; the extraction unit 502 is configured for extracting a face image from the to-be-recognized image on the basis of the facial region information; the first input unit 503 is configured for inputting the face image into a pre-trained convolutional neural network to obtain probabilities of each pixel included in the face image belonging to a category indicated by each category identifier in a preset category identifier set, the convolutional neural network being used to represent a corresponding relationship between an image containing a face and a probability of a pixel belonging to a category indicated by a category identifier in the category identifier set, and the category identifier set having a category identifier indicating a category representing a face part; the second input unit 504 is configured for inputting the face image into a pre-trained key face point positioning model to obtain coordinates of each key face point included in the face image, the key face point positioning model being used for representing a corresponding relationship between an image containing a face and the coordinates of each key face point; the first determination unit 505 is configured for determining a probability of the face image being obscured on the basis of the probabilities and the coordinates; and the second determination unit 506 is configured for determining whether the quality of the face image is up to standard on the basis of the probability of the face image being obscured.

In some embodiments, the specific processing by the acquisition unit 501, the extraction unit 502, the first input unit 503, the second input unit 504, the first determination unit 505 and the second determination unit 506 in the apparatus 500 for determining image quality and the technical effects brought thereby may refer to the steps 201, 202, 203, 204, 205, and 206 in the corresponding embodiment of FIG. 2 respectively, and will not be repeatedly described here.

In some alternative implementations of the present embodiments, the convolutional neural network may be trained by: extracting a preset training sample including a sample image displaying a face and an annotation of the sample image, wherein the annotation may include a data flag for representing whether a pixel in the sample image belongs to a category indicated by a category identifier in the category identifier set; and training using a machine learning method on the basis of the sample image, the annotation, a preset classification loss function and a back propagation algorithm to obtain the convolutional neural network, wherein the classification loss function may be used for representing a degree of difference between a probability output by the convolutional neural network and the data flag included in the annotation.

In some alternative implementations of the present embodiments, the first determination unit 505 may include: a first determination subunit (not shown), configured for determining a face part region set on the basis of the coordinates; a second determination unit (not shown), configured for determining, for each pixel included in the face image, a category indicated by a category identifier corresponding to a maximum probability corresponding to the pixel as a category the pixel attributed to; a calculation subunit (not shown), configured for calculating, for each face part region, a probability of the face part region being obscured on the basis of a category each pixel included in the face part region attributed to; and a third determination subunit (not shown), configured for determining the probability of the face image being obscured on the basis of probabilities of each face part region in the face part region set being obscured.

In some alternative implementations of the present embodiments, the convolutional neural network may include five convolutional layers and five deconvolutional layers, wherein the convolutional layers may be used for downsampling inputted information with a preset window sliding step, and the deconvolutional layers may be used for upsampling the inputted information with a preset amplification factor.

In some alternative implementations of the present embodiments, the window sliding step is 2, and the amplification factor is 2.

In some alternative implementations of the present embodiments, the first determination unit 505 may further include: an input subunit (not shown), configured for inputting the probabilities of the each pixel included in the face image belonging to the category indicated by the each category identifier in the category identifier set and the coordinates of the each key face point included in the face image into a preset probability calculation model to obtain the probability of the face image being obscured. The probability calculation model may be used to represent a corresponding relationship between inputted information and a probability of a face image being obscured. The inputted information may include: probabilities of each pixel included in an image containing a face belonging to a category indicated by each category identifier in the category identifier set and coordinates of each key face point included in the image.

In some alternative implementations of the present embodiments, the calculation subunit may be further configured for: determining, for each face part region, a number of pixels in the face part region attributed to a category not matching a face part represented by the face part region, and determining a ratio of the number to a total number of pixels included in the face part region as the probability of the face part region being obscured.

In some alternative implementations of the present embodiments, the calculation subunit may also be further configured for: determining, for each face part region, a target pixel group including a target pixel, in the face part region, attributed to a category not matching a face part represented by the face part region, summing probabilities of each target pixel in the determined target pixel group belonging to a category matching the face part to obtain a first value, summing probabilities of each pixel in the face part region belonging to a category matching the face part to obtain a second value, and determining a ratio of the first value to the second value as the probability of the facial region being obscured.

In some alternative implementations of the present embodiments, the third determination subunit may be further configured for: determining the probability of the face image being obscured on the basis of an average of the probabilities of the each face part region in the face part region set being obscured.

In some alternative implementations of the present embodiments, the third determination subunit may also be further configured for: acquiring a preset weight for representing an importance level of a face part; and weighting and summing the probabilities of the each face part region in the face part region set being obscured on the basis of the weight to obtain a numeric value, and defining the numeric value as the probability of the face image being obscured.

In some alternative implementations of the present embodiments, the extraction unit 502 may include: an enlarging subunit (not shown), configured for enlarging a range of the facial region indicated by the facial region information to obtain a first facial region; and an extracting subunit (not shown), configured for extracting the first facial region to obtain the face image.

In some alternative implementations of the present embodiments, the facial region may be a rectangular region; and the enlarging subunit may be further configured for: increasing a height and width of the facial region indicated by the facial region information by a preset multiplier factor, or increasing the height and width of the facial region by a preset numeric value.

In some alternative implementations of the present embodiments, the second determination unit 506 may be further configured for: determining whether the probability of the face image being obscured is less than a probability threshold, and if the probability of the face image being obscured is less than the probability threshold, determining the quality of the face image being up to standard.

Figure 6:
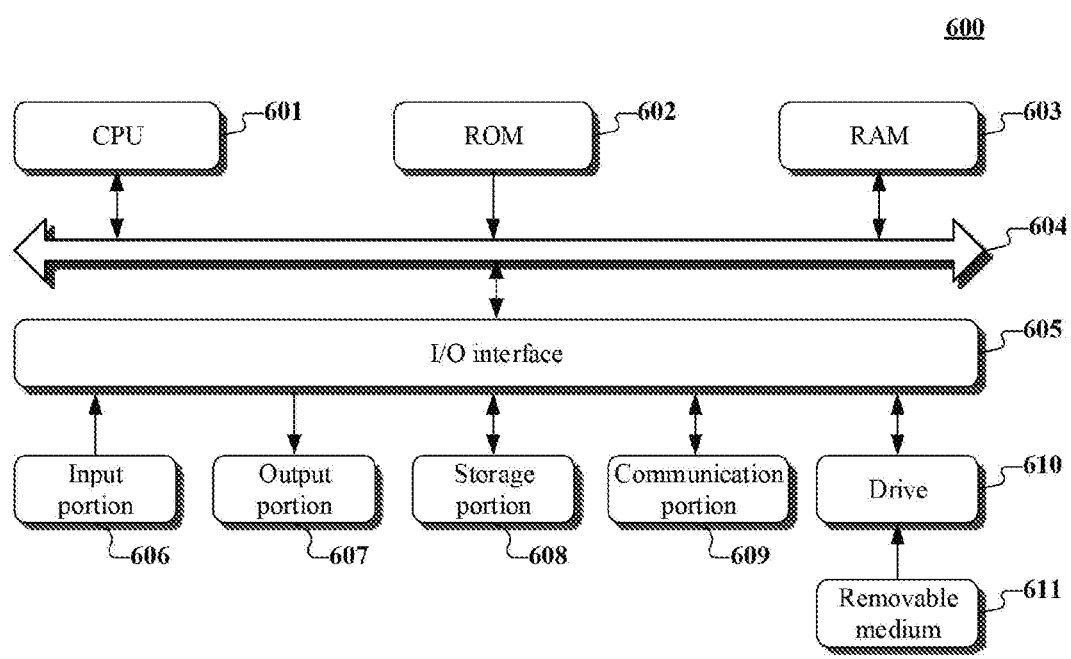
FIG. 6 is a structural schematic diagram of a computer system adapted to implement an electronic device of some embodiments of the present disclosure.

Referring to FIG. 6, a structural schematic diagram of a computer system 600 adapted to implement a server of some embodiments of the present disclosure is shown. The server shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to some embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an acquisition unit, an extraction unit, a first input unit, a second input unit, a first determination unit, and a second determination unit, where the names of these units do not in some cases constitute a limitation to such units themselves. For example, the acquisition unit may also be described as "a unit for acquiring a to-be-recognized image and facial region information obtained by performing facial recognition on the to-be-recognized image in advance and used for indicating a facial region in the to-be-recognized image."

In another aspect, some embodiments of the present disclosure further provide a computer-readable storage medium. The computer-readable storage medium may be the computer storage medium included in the electronic device in the above described embodiments, or a stand-alone computer-readable storage medium not assembled into the electronic device. The computer-readable storage medium stores one or more programs. The one or more programs, when executed by an electronic device, cause the electronic device to: acquiring a to-be-recognized image and facial region information obtained by performing facial recognition on the to-be-recognized image in advance and used for indicating a facial region in the to-be-recognized image; extracting a face image from the to-be-recognized image on the basis of the facial region information; inputting the face image into a pre-trained convolutional neural network to obtain probabilities of each pixel comprised in the face image belonging to a category indicated by each category identifier in a preset category identifier set, the convolutional neural network being used to represent a corresponding relationship between an image containing a face and a probability of a pixel belonging to a category indicated by a category identifier in the category identifier set, and the category identifier set having a category identifier indicating a category representing a face part; inputting the face image into a pre-trained key face point positioning model to obtain coordinates of each key face point comprised in the face image, the key face point positioning model being used for representing a corresponding relationship between an image containing a face and coordinates of each key face point; determining a probability of the face image being obscured on the basis of the probabilities and the coordinates; and determining whether the quality of the face image is up to standard on the basis of the probability of the face image being obscured.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for determining image quality, comprising:
  acquiring a to-be-recognized image and facial region information obtained by performing facial recognition on the to-be-recognized image in advance and used for indicating a facial region in the to-be-recognized image;
  extracting a face image from the to-be-recognized image on the basis of the facial region information;
  inputting the face image into a pre-trained convolutional neural network to obtain probabilities of each of pixels comprised in the face image belonging to a category indicated by each category identifier in a preset category identifier set, the convolutional neural network being used to represent a corresponding relationship between an image containing a face and a probability of a pixel belonging to a category indicated by a category identifier in the category identifier set, and the category identifier set having a category identifier indicating a category representing a face part, wherein the convolutional neural network is trained by:
    collecting a preset training sample comprising a sample image displaying a sample face and annotations of the sample image, wherein the sample face comprises a plurality of sample face parts, and each of the annotations comprising a data flag for representing whether a pixel in the sample image belongs to the category indicated by the category identifier in the category identifer set; and
    training using a machine learning method in the basis of the sample image, the annotation, a preset classification loss function and a back propagation algorithm to obtain the convolutional neutral network, the classification loss function being used for representing a degree of difference between a probability output by the convolutional neural network and the data flag comprised in the annotation;
  inputting the face image into a pre-trained key face point positioning model to obtain coordinates of each key face point comprised in the face image, the key face point positioning model being used for representing a corresponding relationship between an image containing a face and coordinates of each key face point;
  determining a probability of the face image being obscured on the basis of the probabilities and the coordinates; and
  determining whether the quality of the face image is up to standard on the basis of the probability of the face image being obscured.

2. The method according to claim 1, wherein the convolutional neural network comprises five convolutional layers and five deconvolutional layers, the convolutional layers being used for downsampling inputted information with a preset window sliding step, and the deconvolutional layers being used for upsampling the inputted information with a preset amplification factor.

3. The method according to claim 2, wherein the window sliding step is 2, and the amplification factor is 2.

4. The method according to claim 1, wherein the determining a probability of the face image being obscured on the basis of the probabilities and the coordinates comprises:
  inputting the probabilities of the each pixel comprised in the face image belonging to the category indicated by the each category identifier in the category identifier set and the coordinates of the each key face point comprised in the face image into a preset probability calculation model to obtain the probability of the face image being obscured, wherein the probability calculation model is used to represent a corresponding relationship between inputted information and a probability of a face image being obscured, and the inputted information comprises: probabilities of each pixel comprised in an image containing a face belonging to a category indicated by each category identifier in the category identifier set and coordinates of each key face point comprised in the image.

5. The method according to claim 1, wherein the determining a probability of the face image being obscured on the basis of the probabilities and the coordinates further comprises:
  determining a face part region set on the basis of the coordinates;
  determining, for each pixel comprised in the face image, a category indicated by a category identifier corresponding to a maximum probability corresponding to the pixel as a category the pixel attributed to;
  calculating, for each face part region, a probability of the face part region being obscured on the basis of a category each pixel comprised in the face part region attributed to; and
  determining the probability of the face image being obscured on the basis of probabilities of each face part region in the face part region set being obscured.

6. The method according to claim 5, wherein the calculating, for each face part region, a probability of the face part region being obscured on the basis of a category each pixel comprised in the face part region attributed to comprises:
  determining, for the each face part region, a number of pixels in the face part region attributed to a category not matching a face part represented by the face part region, and determining a ratio of the number to a total number of pixels comprised in the face part region as the probability of the face part region being obscured.

7. The method according to claim 5, wherein the calculating, for each face part region, a probability of the face part region being obscured on the basis of a category each pixel comprised in the face part region attributed to further comprises:
    determining, for the each face part region, a target pixel group comprising a target pixel, in the face part region, attributed to a category not matching a face part represented by the face part region, summing probabilities of each target pixel in the determined target pixel group belonging to a category matching the face part to obtain a first value, summing probabilities of each pixel in the face part region belonging to a category matching the face part to obtain a second value, and determining a ratio of the first value to the second value as the probability of the facial region being obscured.

8. The method according to claim 5, wherein the determining the probability of the face image being obscured on the basis of probabilities of each face part region in the face part region set being obscured comprises:
    determining the probability of the face image being obscured on the basis of an average of the probabilities of the each face part region in the face part region set being obscured.

9. The method according to claim 5, wherein the determining the probability of the face image being obscured on the basis of probabilities of each face part region in the face part region set being obscured further comprises:
    acquiring a preset weight for representing an importance level of a face part; and
    weighting and summing the probabilities of the each face part region in the face part region set being obscured on the basis of the weight to obtain a numeric value, and defining the numeric value as the probability of the face image being obscured.

10. The method according to claim 1, wherein the extracting a face image from the to-be-recognized image on the basis of the facial region information comprises:
    enlarging a range of the facial region indicated by the facial region information to obtain a first facial region; and
    extracting the first facial region to obtain the face image.

11. The method according to claim 10, wherein the facial region is a rectangular region; and
    the enlarging the range of the facial region indicated by the facial region information to obtain a first facial region comprises:
    increasing a height and width of the facial region indicated by the facial region information by a preset multiplier factor, or increasing the height and width of the facial region by a preset numeric value.

12. The method according to claim 1, wherein the determining whether the quality of the face image is up to standard on the basis of the probability of the face image being obscured comprises:
    determining whether the probability of the face image being obscured is less than a probability threshold, and if the probability of the face image being obscured is less than the probability threshold, determining the quality of the face image being up to standard.

13. The method according to claim 1, wherein the determining a probability of the face image being obscured on the basis of the probabilities and the coordinates comprises:
    determining semantic information of each key face point in the face image based on the coordinate of each key face point, the semantic information indicating a first face part where each key face point is located;
    determining, from the pixels comprised in the face image, a target pixel in a same position as each key face point;
    determining a category of the target pixel based on the probabilities of each of pixels comprised in the face image, the category indicating a second face part where the target pixel is located;
    for each key face point: determining whether the first face part is identical to the second face part, determining the key face point as a matching point, in response to determining that the first face part is identical to the second face part, and determining the key face point as an unmatching point, in response to determining that the first face part is not identical to the second face part;
    determining a first number of unmatching points;
    determining a total number of key face points in the face image; and
    determining a ratio of the first number to the total number as the probability of the face image being obscured.

14. An apparatus for determining image quality, comprising:
    at least one processor; and
    a memory storing instructions, the instructions when executed by the at least one processor, cause the at least one processor to perform operations, the operations comprising:
    acquiring a to-be-recognized image and facial region information obtained by performing facial recognition on the to-be-recognized image in advance and used for indicating a facial region in the to-be-recognized image;
    extracting a face image from the to-be-recognized image on the basis of the facial region information;
    inputting the face image into a pre-trained convolutional neural network to obtain probabilities of each of pixels comprised in the face image belonging to a category indicated by each category identifier in a preset category identifier set, the convolutional neural network being used to represent a corresponding relationship between an image containing a face and a probability of a pixel belonging to a category indicated by a category identifier in the category identifier set, and the category identifier set having a category identifier indicating a category representing a face part, wherein the convolutional neural network is trained by:
    collecting a preset training sample comprising a sample image displaying a sample face and annotations of the sample imagee, wherein the sample face comprises a plurality of sample face parts, and each of the annotations comprising a data flag for representing whether a pixel in the sample image belongs to the category indicated by the category identifier in the category identifer set; and
    training using a machine learning method in the basis of the sample image, the annotation, a preset classification loss function and a back propagation algorithm to obtain the convolutional neutral network, the classification loss function being used for representing a degree pf difference between a probability output by the convolutional neural network and the data flag comprised in the annotation;
    inputting the face image into a pre-trained key face point positioning model to obtain coordinates of each key face point comprised in the face image, the key face point positioning model being used for representing a corresponding relationship between an image containing a face and coordinates of each key face point;
    determining a probability of the face image being obscured on the basis of the probabilities and the coordinates; and determining whether the quality of the face image is up to standard on the basis of the probability of the face image being obscured.

15. The apparatus according to claim 14, wherein the determining a probability of the face image being obscured on the basis of the probabilities and the coordinates further comprises:
   determining a face part region set on the basis of the coordinates;
   determining, for each pixel comprised in the face image, a category indicated by a category identifier corresponding to a maximum probability corresponding to the pixel as a category the pixel attributed to;
   calculating, for each face part region, a probability of the face part region being obscured on the basis of a category each pixel comprised in the face part region attributed to; and
   determining the probability of the face image being obscured on the basis of probabilities of each face part region in the face part region set being obscured.

16. A non-transitory computer storage medium storing a computer program, the computer program when executed by one or more processors, causes the one or more processors to perform operations, the operations comprising:
   acquiring a to-be-recognized image and facial region information obtained by performing facial recognition on the to-be-recognized image in advance and used for indicating a facial region in the to-be-recognized image;
   extracting a face image from the to-be-recognized image on the basis of the facial region information;
   inputting the face image into a pre-trained convolutional neural network to obtain probabilities of each of pixels comprised in the face image belonging to a category indicated by each category identifier in a preset category identifier set, the convolutional neural network being used to represent a corresponding relationship between an image containing a face and a probability of a pixel belonging to a category indicated by a category identifier in the category identifier set, and the category identifier set having a category identifier indicating a category representing a face part, wherein the convolutional neural network is trained by:
   collecting a preset training sample comprising a sample image displaying a sample face and annotations of the sample image, wherein the sample face comprises a plurality of sample face parts, and each of the annotations comprising a data flag for representing whether a pixel in the sample image belongs to the category indicated by the category identifier in the category identifer set; and
   training using a machine learning method in the basis of the sample image, the annotation, a preset classification loss function and a back propagation algorithm to obtain the convolutional neutral network, the classification loss function being used for representing a degree pf difference between a probability output by the convolutional neural network and the data flag comprised in the annotation;
inputting the face image into a pre-trained key face point positioning model to obtain coordinates of each key face point comprised in the face image, the key face point positioning model being used for representing a corresponding relationship between an image containing a face and coordinates of each key face point;
determining a probability of the face image being obscured on the basis of the probabilities and the coordinates; and
determining whether the quality of the face image is up to standard on the basis of the probability of the face image being obscured.

* * * * *